POWER TRANSISTOR CONTROL CIRCUIT

Filed June 18, 1958

Inventor
John Baude
By [signature]
Attorney

United States Patent Office 2,972,685

Patented Feb. 21, 1961

2,972,685

POWER TRANSISTOR CONTROL CIRCUIT

John Baude, Milwaukee, Wis., assignor to Allis-Chalmers Manufacturing Company, Milwaukee, Wis.

Filed June 18, 1958, Ser. No. 742,925

6 Claims. (Cl. 307—88.5)

This invention relates generally to electric switches and in particular to those electric switches wherein a semi-conductor element is used as the controlling device.

Electric switches embodying transistors as the current controlling element are very desirable because of their rapid response, time, elimination of moving contacts and relatively small size. Since the transistor is not one hundred percent efficient, that is to say, a certain amount of the power applied to the transistor is dissipated within the transistor itself, the current handling capacity of a switch embodying the transistor is limited by the amount of power which the transistor can dissipate. It is obvious therefore that the current handling ability of a transistor switch may be increased if the efficiency of the switch can be improved.

In line with accepted transistor switching theory (see AIEE transactions paper 55-156 by R. L. Bright) it therefore appears that a PNP type transistor in an alternating current circuit conducts better during the half cycle in which the emitter is positive with respect to base and collector than when the collector is positive with respect to base and emitter. For example, when an alternating current is passed through the emitter-collector junction, the voltage drop in the forward direction will be substantially less than the voltage drop in the reverse direction. This means that on the reverse cycle the transistor is dissipating a greater amount of energy than the amount of energy being dissipated within the transistor on the forward portion of the cycle. The current handling ability of the transistor would be greatly increased if the efficiency can be made equal in both directions.

Certain types of transistors have been constructed which are as efficient in one direction as they are in the other. However, these transistors are expensive and thereby eliminate one of the advantages for using transistors in a switching circuit. It would be assumed that if a second transistor is connected in parallel to the first transistor in an alternating current switch that the efficiency would remain the same and the current capacity doubled. This is not the case. In my invention, I have connected two transistors in an opposing parallel relationship so that the current passes through a transistor which is polarized for favorable conduction during both half cycles of alternating current. Therefore, the voltage drop in any portion of the cycle will be only as great as that which appears across the most favorable mode of conduction of the transistor. By reducing the reverse voltage drop across the switch during the unfavorable mode of conduction for a transistor, the dissipation within that transistor will be greatly reduced and the current carrying capacity of the switch will be substantially increased.

It is therefore an object of this invention to create a transistor switch for application in an alternating current circuit.

It is another object of this invention to improve the current carrying capacity of an alternating current transistor switch.

Still another object of this invention is to provide a static control system which has no moving parts.

Other objects and advantages of this invention will become apparent from the following description taken in connection with the accompanying drawings wherein are set forth by way of illustration and example certain embodiments of this invention.

Figures 1, 2, 3, 4, 5, 6:
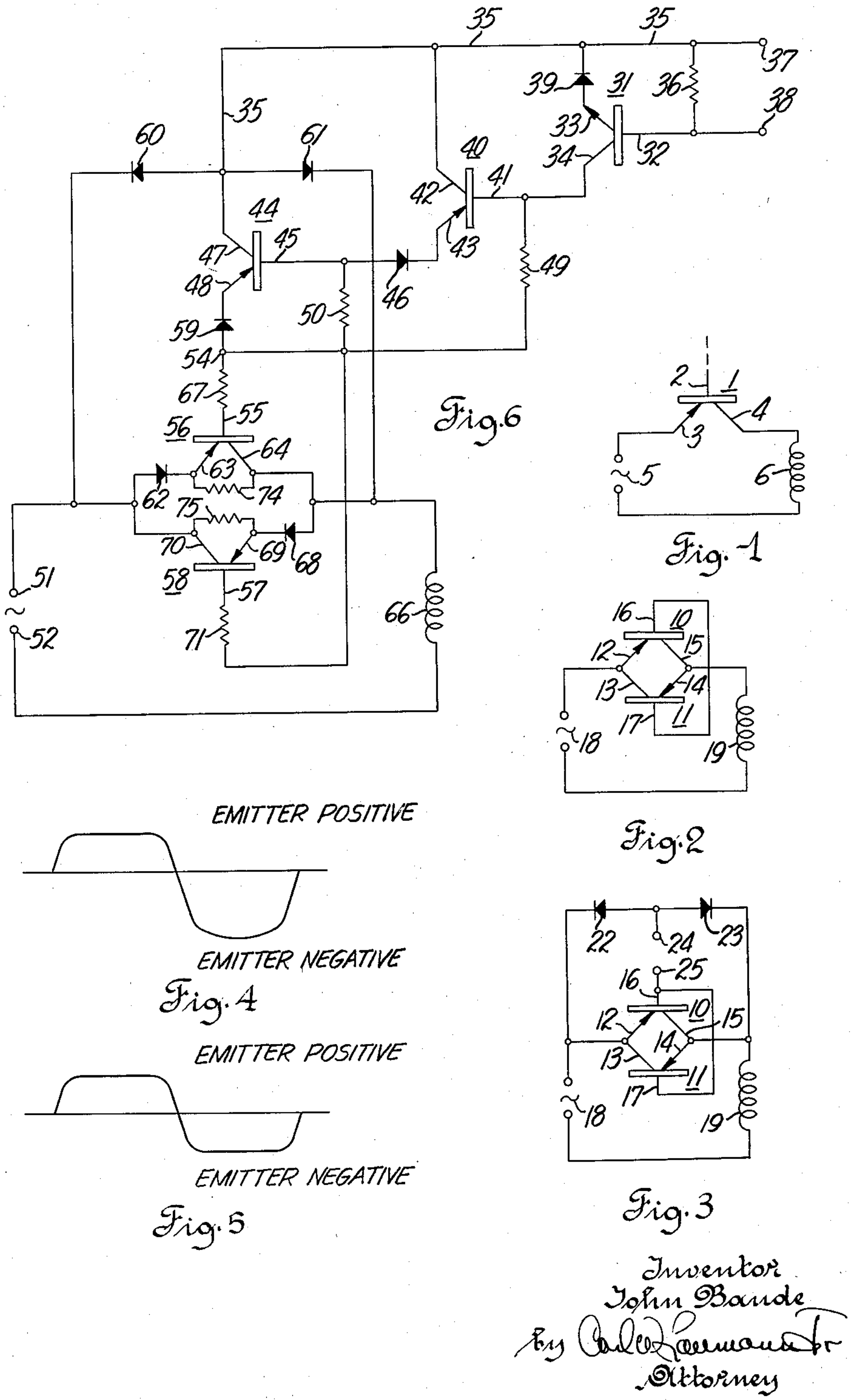
Fig. 1 is a schematic drawing of a simple transistor switch.
Fig. 2 is a schematic drawing of a portion of a transistor switch embodying my invention.
Fig. 3 is a schematic drawing of a transistor switch embodying my invention.
Fig. 4 is a graph showing the voltage amplitude curve across the transistor switch when only a single transistor is used.
Fig. 5 is a graph showing a voltage amplitude curve across the transistors when two transistors are connected according to my invention.
Fig. 6 is a schematic drawing of a more elaborate transistor switch embodying my invention.

Fig. 1 is illustrative of a very simple form of transistor switch. The transistor 1 of the PNP junction type has a base electrode 2, an emitter electrode 3 and a collector electrode 4. An alternating current source of power 5 supplies energy through the emitter-collector circuit to the load 6. This switch has well known properties and will behave as an open circuit when the base is left floating as shown in Fig. 1, or when the base is connected to the emitter and also when the base is biased positively with respect to either the emitter or the collector.

Looking now at Fig. 2, a pair of PNP junction transistors 10 and 11 are connected according to my invention. The emitter 12 of transistor 10 is connected to the collector 13 of transistor 11 and in a similar manner the emitter 14 of transistor 11 is connected to the collector 15 of transistor 10. In this way, an emitter-collector circuit is formed in which emitter and collectors of transistors 10 and 11 are connected in opposing parallel relation. The base electrode 16 of transistor 10 is interconnected with the base electrode 17 of transistor 11. The emitter-collector circuit so formed is in series with the source of alternating current 18 and the load 19.

In the case of Fig. 2, the bases 16 and 17 are not connected to any other part of the circuit so the transistors are in the nonconductive state and the switch is open. The transistors in this circuit have their base electrodes interconnected and the emitter electrodes and collector electrodes are in a complementary parallel relationship in series with the load and the source.

Fig. 3 shows the basic circuit of my invention as it might be used in some applications. The basic connections are the same as shown in Fig. 2, and the same reference characters have been used for similar elements. The addition of diodes 22 and 23 makes it possible to selectively connect the bases of transistors 16 and 17 to the more negative side of the transistor switch thereby enabling the transistors to enter into a state of conduction. In the Fig. 3 the terminals 24 and 25 are shown without an interconnection. In this condition, the transistors 10 and 11 will not conduct and therefore no current would flow in the load. However, should these terminals be bridged, either by a mechanical connection or another transistor the emitter-collector circuit of transistors 10 and 11 would enter into a state of conduction and current would flow through the load 19.

Fig. 4 illustrates the voltage amplitude trace which would be obtained if an oscilloscope were placed to measure the voltage across the transistor of Fig. 1. It can be observed that the voltage across this transistor when in the conducting state is not symmetrical. In other words, the transistor conducts better in one direction than in the other direction. Since the current which is not being conducted through the transistor is being dissipated as heat within the transistor, it is lost energy and it is desirable to eliminate this energy and make a more efficient transistor switch. In addition to the increased efficiency and better operation of the transistor switch, the elimination of internal heat from the transistor increases the rating of the transistor switch. This is due to the fact that any transistor is limited in the amount of current it can carry by the amount of energy which is dissipated within the transistor. Where a suitable means can be found for keeping the transistor below the critical temperature point a relatively large amount of current may be carried.

The unsymmetrical wave form, as shown in Fig. 4, may be improved upon by connecting the transistors in complementary parallel relationship as shown in Fig. 2. In this manner, the high voltage drop which appeared in Fig. 4 is eliminated by the low emitter-collector resistance of the second transistor. The second transistor conducts in a favorable mode while the first transistor is conducting in the unfavorable mode. This means that at least one transistor junction is conducting in the low voltage direction regardless of the direction of flow of alternating current through the switch. It can be seen that the area under the curve in Fig. 5 which represents the energy dissipated as heat within the transistor is considerably smaller than the area under the curve in Fig. 4 for a single transistor.

Thus, while it would be expected to obtain double the current capacity by adding a second transistor, the actual advantage obtained in increased rating is substantially greater than twice the rating of a single transistor under similar control circuit conditions.

Fig. 6 is a schematic diagram of the completed invention. It will be observed that several transistors are used to amplify the signal pulse which is applied at terminals. Transistor 31 is of the NPN junction type and has a base electrode 32, an emitter electrode 33 and a collector electrode 34. Between the base electrode 32 and conductor 35 is an input resistor 36. The input voltage or signal voltage is applied across input resistor 36. When a voltage of the polarity indicated is applied at terminals 37 and 38 the transistor 31 enters into a state of conduction from the collector 34 to the emitter 33 and through the diode 39 to conductor 35. The purpose of the diode 39 will be explained later since it is not essential to the operation of the device.

As was mentioned earlier, the transistor of the PNP junction type has the property of entering into a conducting condition when the base electrode is connected to the collector electrode. That is exactly what happens to transistor 40 when transistor 31 enters the conducting condition. When transistor 31 conducts from emitter to colleetor a connection is made from the base elcetrode 41 through the collector electrode 34 and emitter electrode 33 of transistor 31 through the diode 39 and conductor 35 to the collector electrode 42 of transistor 40.

This places PNP transistor 40 in a state of conduction from the emitter electrode 43 to the collector electrode 42 because the base 41 has been connected to the collector 42. When transistor 40 enters into a state of conduction it affects transistor 44 and switches it to the conducting condition. The action here is the same, having the base electrode 45 of transistor 44 connected through the diode 46, the emitter electrode 43 of transistor 40 and collector electrode 42 of transistor 40 to the conductor 35 and back to the collector electrode 47 of transistor 44. This operates to close or bring into a state of conduction transistor 44 through the emitter 48 collector 47 circuit. A circuit is then completed from the connection common to the base electrode 55 of PNP transistor 56 and the base electrode 57 of PNP transistor 58 connected to the point 54, through resistor 67 and resistor 71. From point 54, the connection follows through diode 59, the emitter 48 of transistor 44, the collector 47 of transistor 44 and in the alternative diode 60 and diode 61 to the most negative side of the switch.

Assuming now that the voltage at terminal 51 is positive and the voltage at terminal 52 is negative, the conduction will be traced through the transistor switch. The flow of current through the diode 60 is blocked. The flow of current through diode 62 is in the favorable direction so a high positive voltage appears at the emitter 63 of transistor 55. Since emitter 63 is at a higher positive than the base 55 the transistor 56 is in a conducting condition and the current flows from the emitter 63 to the collector 64 to the other side of the transistor switch to the load 66 and back to the source across terminals 51 and 52. The base control current flows through resistor 67 through the diode 59, the emitter 48 of transistor 44 and the collector 47 of transistor 44 through diode 61 to the negative side of the transistor switch.

Although the voltage drop across the transistor switch is relatively small in comparison with the voltage drop across the load, it is nevertheless sufficient to allow control current to flow through the base to completely close the transistor switch and maintain a low voltage drop across the emitter-collector elecrodes. On the alternate cycle the terminal 52 is positive and the terminal 51 is negative. Current is blocked by diode 61 but is permitted to flow through the low resistance direction of diode 68 through the emitter 69 to the collector 70 of transistor 58 and back to the alternating current source across terminals 51 and 52. The transistor 58 conducts because the emitter electrode 69 is at a higher positive potential than the base electrode 57 due to the ohmic drop across the junction of the transistor. The baes is connected through resistor 71 and diode 59 and the emitter 48 and collector 47 of transistor 44 and diode 60 back to the negative side of the transistor switch. Once again, the voltage drop across the transistor switch, although relatively small, is nevertheless sufficient to permit enough base current to flow to completely close the transistor switch.

In the absence of a signal voltage of the polarity indicated being applied to the control input terminals 37 and 38 the transistor 31 will not be conductive. This is due to the fact that the emitter-collector circuit of a NPN transistor is cut off when the base is made negative with respect to the emitter or the collector. The presence of diode 39 in the emitter circuit creates a voltage drop in the direction to make the base 32 more negative than the emitter 33. This means that the transistor will normally act as an open circuit between the collector 34 and the emitter 33.

In a similar manner, diode 46 in series with the emitter 43 of transistor 40 serves to create a voltage drop which raises the potential of the base 41 relative to the emitter 43 and makes the base 41 more positive than the emitter 43 to cut off the transistor 40. The resistor 49 ties the base to the emitter circuit to take advantage of the voltage drop across the diode 46. Since transistor 40 is cut off, the base of transistor 45 is effectively disconnected from the collector 47 and this transistor is also cut off.

Bias for transistor 44 is obtained by the voltage drop across diode 59 in series with the emitter 48 which raises the potential of the base 45 of transistor 44 relative to the emitter 48 and effectively cuts off this transistor. The resistor 50 ties the base to the emitter circui to take advantage of the voltage drop across diode 59.

The diode 62 in series with the emitter 63 of transistor 56 and the diode 68 in series with the emitter 69 of transistor 58 also serve to bias to cut off by raising the potential of the bases to a higher positive value than the potential of the emitters.

The voltage drop across the diode 62 will vary with the collector leakage current of the transistor 56. If the leakage current is very small, the voltage drop will be relatively slight, however, the addition of a resistor 74 from the emitter 63 of transistor 56 to the collector 64 of transistor 56 creates a certain minimum current thereby establishing a constant voltage drop across the diode 62. This constant voltage drop serves to bias the transistor well into the region of cutoff regardless of the leakage current. A similar resistor 75 from the collector 70 to the emitter 69 of transistor 58 would accomplish the same result relative to this transistor. The disadvantage of such a resistor is that the gain of the switch is decreased and a higher base current is required for the same collector current.

Resistor 67 and resistor 71 in the base circuit of transistors 56 and 58 serve the purpose of isolating the base electrodes. It has been observed experimentally that a slight difference in potential exists between the base of transistor 56 and the base of transistors 58. If the resistors are removed and the bases directly interconnected, the voltage drop across the transistor conducting in the favorable direction is slightly increased. This is apparently due to the interaction of the difference in potential between the two base electrodes. The addition of a small value of resistance in series with the base effectively isolates them and decreases the effect of this difference in potential.

Although but one embodiment of the present invention has been illustrated and described, it will be apparent to those skilled in the art that various changes and modifications may be made therein without departing from the spirit of the invention or from the scope of the appended claims.

What is claimed is:

1. In an electrical switch for controlling the flow of alternating current from a source to a load, a pair of transistors each having a base electrode, an emitter electrode and a collector electrode, first circuit means interconnecting said base electrodes, means connecting said emitter and collector electrodes in series circuit with said source and said load and in opposing parallel relationship with each other, a pair of unidirectional current elements connecting said base electrode to the source side of said switch and the load side of said switch, said unidirectional current elements so polarized as to form a low impedance path from said base electrode to the more negative side of said switch, switch means for isolating said base electrodes from said unidirectional current elements.

2. In an electric switch for controlling the flow of alternating current from a source to a load, a pair of transistors each having a base electrode, an emitter electrode and a collector electrode, first circuit means interconnecting said base electrodes, means connecting said emitter and collector electrodes in opposing parallel relationship with each other to control the flow of current from said source through said load, a pair of unidirectional current elements connecting said base electrode to the source side of said switch and the load side of said switch, said unidirectional current elements so polarized as to form a low impedance path from said base electrode to the more negative side of said switch, switch means for isolating said base electrodes from said unidirectional current elements.

3. In an electric switch for controlling the flow of alternating current from a source to a load, a pair of transistors each having a base electrode, an emitter electrode and a collector electrode, first circuit means interconnecting said base electrodes, means connecting said emitter and collector electrodes in complementary parallel relationship with each other to control the flow of current from said source through said load, a pair of unidirectional current elements connecting said base electrodes to the source side of said switch and the load side of said switch, said unidirectional current elements polarized and connected to form a low impedance path from said base electrodes to the more negative side of said switch, a third transistor having a base electrode, an emitter electrode and a collector electrode, two of said electrodes of said third transistor forming switch elements between said first circuit means and a point common to both of said unidirectional current elements, control means connected to said third transistor for varying the state of conduction between said switch elements.

4. In an electric switch for controlling the flow of alternating current from a source to a load, a pair of transistors each having a base electrode, an emitter electrode and a collector electrode, first circuit means interconnecting said base electrodes, means connecting said emitter and collector electrodes in complementary parallel relationship with each other to control the flow of current from said source through said load, a unidirectional current element in circuit with each of said emitter electrodes for creating a voltage drop tending to bias the base electrode in a manner to reduce the flow of current through said emitter-collector circuit, a pair of unidirectional current elements connecting said base electrodes to opposite sides of said switch, said elements polarized and connected to form a low impedance path from said base electrode to the more negative side of said switch, a third transistor having a base electrode, an emitter electrode and a collector electrode, two of said third transistor electrodes forming a switch between said first circuit means and a point common to both of said pair of unidirectional current elements, control means connected to said third transistor for varying the state of conduction between said third transistor electrodes forming a switch.

5. In an electric switch for controlling the flow of alternating current from a source to a load, a pair of transistors each having a base electrode, an emitter electrode and a collector electrode, first circuit means interconnecting said base electrodes, means connecting said emitter and collector electrodes in complementary parallel relationship with each other to control the flow of current from said source through said load, a unidirectional current element in circuit with each of said emitter electrodes and polarized to create a voltage drop tending to bias the base electrode in a manner to reduce the flow of current through said emitter-collector circuit, a pair of unidirectional current elements connecting said base electrodes to opposite sides of said switch, said elements so polarized and connected as to form a low impedance path from said base electrode to the more negative side of said switch, a third transistor having a base electrode, an emitter electrode and a collector electrode, two of said third transistor electrodes forming a switch between said first circuit means and a point common to both of said pair of unidirectional current elements, control means connected to said third transistor for varying the state of conduction through the switch formed by said third transistor electrodes, a resistor interconnecting the base and emitter electrodes of said third transistor, a unidirectional current element in circuit with the emitter electrode of said third transistor and coacting with said resistor to create a bias voltage across the emitter base electrodes of said third transistor of the polarity tending to reduce the flow of current between said collector and emitter electrodes, means connected to the base and collector electrodes of said third transistor for varying the state of conduction between said collector and emitter electrodes.

6. In a bidirectional transistor switch, a pair of transistors each having a base electrode, an emitter electrode and a collector electrode, first circuit means interconnecting said base electrodes, means connecting said emitter and collector electrodes to form two switch terminals with said transistors in opposing parallel relationship between said terminals, a pair of unidirectional current elements connected in series opposition across said terminals and polarized to provide a potential at their common connection that is of the proper polarity to forward bias said base electrodes, and means for connecting said base electrodes to said common connection of said unidirectional current elements to close the transistor switch.

References Cited in the file of this patent

UNITED STATES PATENTS

| | | |
|---|---|---|
| 2,662,124 | McMillan | Dec. 8, 1953 |
| 2,728,857 | Sziklai | Dec. 27, 1955 |
| 2,730,576 | Caruthers | Jan. 10, 1956 |
| 2,831,987 | Jones | Apr. 22, 1958 |